(12) United States Patent
Kataria et al.

(10) Patent No.: US 11,468,199 B2
(45) Date of Patent: Oct. 11, 2022

(54) AUTHENTICATED DEBUG FOR COMPUTING SYSTEMS

(71) Applicant: Apple Inc., Cupertino, CA (US)

(72) Inventors: Mukesh Kataria, Fremont, CA (US); Jerrold V. Hauck, Windermere, FL (US)

(73) Assignee: Apple Inc., Cupertino, CA (US)

( * ) Notice: Subject to any disclaimer, the term of this patent is extended or adjusted under 35 U.S.C. 154(b) by 30 days.

(21) Appl. No.: 16/936,150

(22) Filed: Jul. 22, 2020

(65) Prior Publication Data

US 2022/0027519 A1 Jan. 27, 2022

(51) Int. Cl.
| | |
|---|---|
| *H04L 29/06* | (2006.01) |
| *G06F 21/71* | (2013.01) |
| *H04L 9/32* | (2006.01) |
| *G01R 31/3177* | (2006.01) |
| *G01R 31/317* | (2006.01) |
| *H04L 9/40* | (2022.01) |

(52) U.S. Cl.
CPC ......... *G06F 21/71* (2013.01); *G01R 31/3177* (2013.01); *G01R 31/31705* (2013.01); *H04L 9/3247* (2013.01); *H04L 9/3268* (2013.01); *H04L 63/20* (2013.01); *G06F 2221/2111* (2013.01)

(58) Field of Classification Search
CPC ... H04L 9/3247; H04L 9/3238; H04L 9/3263; H04L 63/20; H04L 9/3268; G06F 2221/2111
USPC .............................................................. 726/1
See application file for complete search history.

(56) References Cited

U.S. PATENT DOCUMENTS

| | | | |
|---|---|---|---|
| 7,681,078 B2 * | 3/2010 | Moyer | G06F 11/3656 714/23 |
| 8,352,713 B2 | 1/2013 | Burke et al. | |
| 10,318,407 B2 | 6/2019 | Williams et al. | |
| 10,873,466 B2 * | 12/2020 | Wu | G06F 21/64 |
| 2015/0134851 A1 * | 5/2015 | Relan | H04L 45/126 709/241 |
| 2015/0331043 A1 | 11/2015 | Sastry et al. | |
| 2017/0103221 A1 | 4/2017 | Goel et al. | |

* cited by examiner

*Primary Examiner* — Longbit Chai
(74) *Attorney, Agent, or Firm* — Kowert, Hood, Munyon, Rankin & Goetzel, P.C.; Scott W. Pape; Dean M. Munyon

(57) ABSTRACT

An apparatus includes one or more functional circuits, a debug circuit configured to implement one or more debug features for the one or more functional circuits, and a validation circuit. The validation circuit is configured to receive a request to access debug features, and to send an identification value corresponding to the apparatus. The validation circuit is further configured to receive a certificate generated by a server computer system, the certificate including encoded debug permissions, and to decode the debug permissions using the identification value. Using the decoded debug permissions, the validation circuit is further configured to enable one or more of the debug features.

20 Claims, 10 Drawing Sheets

| request 133 | |
|---|---|
| device information 502 | requested number of resets 508 |
| current device configuration 504 | requested debug features 510 |
| liveness token 506 | user credentials 512 |

| Policies 420 | | |
|---|---|---|
| user ID 522a | | |
| device ID 524a | locations 526a | permissions 528a |
| device ID 524b | locations 526b | permissions 528b |
| device class 525c | locations 526c | permissions 528c |
| device ID 524a | | |
| user ID 522a | locations 526d | permissions 528d |
| user ID 522b | locations 526e | permissions 528e |
| user team 529a | locations 526f | permissions 528f |
| user team 529b | locations 526g | permissions 528g |

| Certificate 135 | |
|---|---|
| user information 532 | permitted number of resets 538 |
| device information 502 | debug permissions 540 |
| server token 536 | liveness token 506 |
| certificate ID 533 | certificate signature 534 |
| certificate epoch 535 | |

Start
801

Maintaining, by a server computer system, one or more policies that indicate debug permissions for one or more users to access debug features of one or more devices.
810

Receiving, by the server computer system from a debug system, a request to access debug features of a particular device, the request including an identification value associated with the particular device.
820

Validating, by the server computer system using the identification value, the request.
830

In response to the validating, determining, by the server computer system, debug permissions for a particular user based on the one or more policies.
840

Sending, by the server computer system, a certificate to the debug system, the certificate indicating the debug permissions.
850

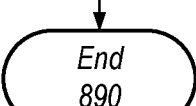

End
890

*FIG. 8*

AUTHENTICATED DEBUG FOR COMPUTING SYSTEMS

BACKGROUND

Technical Field

Embodiments described herein are related to the field of computing devices, and more particularly to techniques for debugging computing devices.

Description of the Related Art

Debug is an important technique for testing and evaluating various types of computing devices, such as individual integrated circuits, individual computer systems, and even enterprise computing systems with multiple devices. Debug may be used to test hardware, software, and/or a combination thereof. When debugging a device, a debug tool is typically used to gain access to the inner workings of the device. For example, a debug tool may allow a user to see an execution trace of program instructions in the order the instructions are executed, as well as seeing values of variables and registers within the device. Using a debug tool, therefore, may allow a programmer to observe an order of execution of a program to determine whether the program is behaving in an expected manner, or allow a hardware engineer observe whether functional blocks are generating expected results from a particular set of inputs. Debugging, therefore, provides a useful tool for determining proper functionality of hardware and/or software.

Debug interfaces, however, present a security problem. Typically, devices permit debug by anyone with the appropriate set of tools and knowledge necessary to enable debug features of a device. The same debugging features that allow developers to access the inner workings of a device may allow a hacker or other user with bad intent to access sensitive data that is stored on the device, or to operate the device to perform unauthorized operations. Some devices, therefore, may include a fuse circuit or other type of one-time programmable memory to disable debug features of a device prior to shipping the device from a manufacturing facility. Once the device has been "fused" (e.g., the fuse circuit programmed) it cannot be debugged anymore. Situations, however, may arise in which use of debug features is desirable post-production.

SUMMARY OF THE EMBODIMENTS

Broadly speaking, an apparatus, a non-transitory computer-readable medium, and a method are contemplated in which the apparatus includes one or more functional circuits, a debug circuit configured to implement one or more debug features for the one or more functional circuits, and a validation circuit. The validation circuit is configured to receive a request to access debug features, and to send an identification value corresponding to the apparatus. The validation circuit is further configured to receive a certificate generated by a server computer system, the certificate including encoded debug permissions, and to decode the debug permissions using the identification value. Using the decoded debug permissions, the validation circuit is further configured to enable one or more of the debug features.

In a further example, in response to receiving the request, the validation circuit may generate a liveness token that includes a one-time use value. The validation circuit may send the generated liveness token with the identification value.

In another example, in response to receiving the certificate, the validation circuit may compare a received liveness token extracted from the certificate to the generated liveness token. Based on the comparison, the validation circuit may selectively permit the debug circuit to be accessed.

In one example, the validation circuit may send information indicative of available features of the debug circuit and currently enabled features of the debug circuit. In an embodiment, in response to receiving the certificate, the validation circuit may determine if the reception of the certificate is expected.

In one example, the validation circuit may end an active debug session in response to a determination that a particular amount of time has elapsed since receiving the certificate. The particular amount of time may be indicated in the certificate. In a further example, the validation circuit may end an active debug session in response to a determination that a number of allowed device resets, as indicated by the certificate, have occurred.

In another example, the validation circuit may receive the request from a first computing device. In response to a determination that a second computing device has been connected to the apparatus, the validation circuit may end an active debug session. In one example, the validation circuit may authenticate a digital signature that is included in the received certificate.

BRIEF DESCRIPTION OF THE DRAWINGS

The following detailed description makes reference to the accompanying drawings, which are now briefly described.

FIG. 5 shows three tables depicting a certificate request, policies used to process requests, and a certificate generated in response to a request.

FIG. 8 shows a flow diagram of an embodiment of a method for operating a server computer system that supports authenticated debugging techniques.

Figure 1:
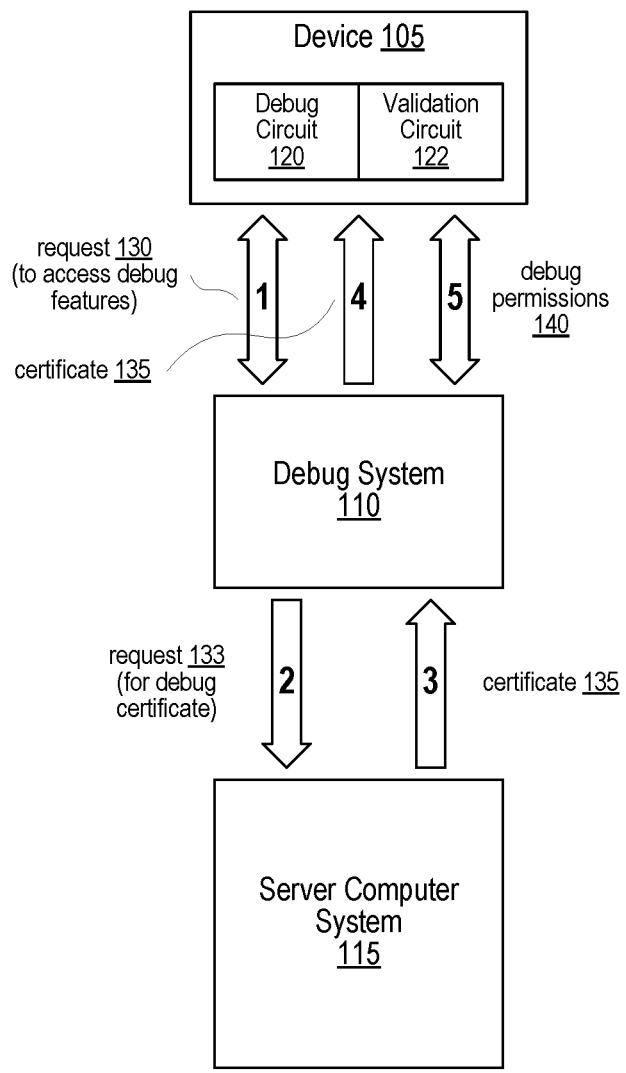
FIG. 1 illustrates a block diagram of an embodiment of a system supporting authenticated debugging techniques.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Disabling access to debug features is commonly achieved through use of one or more fuses or other forms of one-time programmable memory circuits. Use of a one-time programmable memory circuit may increase a difficulty for a hacker or other user to gain unauthorized access to debug features of a device that has entered production. In some cases, however, there may be a legitimate use for accessing debug features of a device that has entered production, for example, to troubleshoot a device that is performing poorly, to evaluate a device after an extended period of use, and the like. Accordingly, the present inventors have identified a use for a technique that allows authorized users to gain access to debug features while maintaining restrictions against unauthorized use.

Embodiments of apparatus and methods are presented in which a device is augmented with a debug authorization circuit for authenticating debug requests. The debug authorization circuit implements a policy enforcement engine, which enforces debug policies for the device. The debug authorization circuit does not manage the policies, but rather receives the policy information as part of a debug request and enforces, within the device, restrictions associated with the received policy information. The debug authorization circuit is connected to a debug port of the device, such as a Joint Test Action Group interface (JTAG), serial wire debug interface (SWD), and others. By connecting to the debug port, the debug authorization circuit may serve as a "gate keeper" to the rest of the device. If debug is authenticated via the policy, then the debug authorization circuit permits the debug commands from the port to be propagated to the rest of the device.

A particular debug tool is used to access the debug authorization circuit. This debug tool may include software running on a computer system, and/or may include hardware circuits for communicating with the debug authorization circuit. To access debug features of the device, the debug tool requests a certificate from a server system that maintains debug policies for all devices, and users, associated with the particular debug tool. In response to a certificate request, the server authenticates the request, including, for example, authenticating the user of the debug tool, the device being debugged, a location of the device, or a combination thereof. The server also verifies, using the debug policies, a set of debug features that the user is allowed, based on the authenticating, to access. A certificate is generated indicating the allowed features, and is sent to the debug tool which, in turn, sends the certificate to the debug authorization circuit on the device to be debugged. The debug authorization circuit enables various debug features based on permissions included in the certificate.

A block diagram for an embodiment of a system using an authorized debug technique is illustrated in FIG. 1. System 100 includes a device to be debugged (device 105), a debug tool for performing the debug (debug system 110), and a server for maintaining debug policies and issuing debug certificates (server computer system 115). The numbered arrows in FIG. 1 indicate a flow of information between the various components of system 100 and an order in which the information is exchanged.

As illustrated, device 105 may be any suitable computing device capable of being accessed via a debug interface. For example, device 105 may be a computer system, a smartphone, a tablet, a wearable device, and the like. In some embodiments, device 105 is an integrated circuit (IC) such as a system-on-chip (SoC), an application processor, a graphics processor, etc. Debug system is coupled to device 105 using a wired or wireless debug interface (e.g., JTAG). In various embodiments, debug system 110 may be a desktop or laptop computer executing debug tool software, a debug specific hardware tool, or a combination thereof.

To initiate a debug session, debug system 110 is configured to send, to device 105, request 130 to access debug features of the device, the debug features enabled through use of debug circuit 120. Validation circuit 122, included in device 105, is configured to receive request 130, and in response, send an identification value that corresponds to device 105 to debug system 110. The identification value may include any suitable value that uniquely identifies device 105 from other device similar to device 105, such as a unique identification number (UID).

In response to receiving the identification value from the device, debug system 110 is configured to send, to server computer system 115, request 133 for a debug certificate to access the debug features of device 105. Request 133 includes the received identification value. In addition, request 133 may include other information, such as user credentials for a current user of debug system 110 that is making the debug request and/or indications for which debug features are being requested. In some embodiments, geographic or network location data may be included in request 133. Server computer system 115 is configured to receive request 133 and to access a repository of maintained policies to determine if the requesting user has permission to debug the device identified by the received identification value. In some embodiments, a policy that indicates that the user has permissions for debugging the indicated device may also include indications of particular debugging features for which the user has access. For example, device 105 may include several processor cores, such as a main processing complex, an audio processor, a graphics processor, a network processor, and other functional circuits that are capable of being accessed by debug circuit 120. A corresponding policy for the device may indicate which functional circuits the user is allowed to access.

After validating the user, server computer system 115 is further configured to generate certificate 135. As shown, server computer system 115 validates the user based on information included in request 133, including, for example, user credentials, device credentials, and/or location data. Certificate 135 provides an indication that the requesting user has permission to access debugging features of device 105 and may further place limits on specific features the user is allowed to access. Certificate 135 may be digitally signed and/or encrypted by server computer system 115 to indicate that certificate 135 is authentic, and not an old certificate being reused or a fake certificate created by a hacker to gain unauthorized access. Debug system 110 is further configured to receive certificate 135 from server computer system 115, and in some embodiments, is not configured to decrypt the certificate and/or verify a digital signature. Rather, debug system 110 is further configured to send certificate 135 to validation circuit 122 on device 105.

As shown, validation circuit 122 is further configured to receive certificate 135 that was generated by server computer system 115, and to decode debug permissions 140 using the identification value. Server computer system 115 may utilize any suitable method for signing and/or encrypting certificate 135, such as sharing an encryption keyword, use of public key algorithms, and the like. In some embodiments for example, the identification value previously sent by device 105 may be used by server computer system 115 to select a particular keyword for encoding certificate 135. Device 105 has access to, or may generate, the same keyword based on this identification value.

Using the decoded debug permissions 140, validation circuit 122 is further configured to enable one or more of the debug features on debug circuit 120. Certificate 135 may, for example, indicate that the user is allowed to access debug features associated with a graphics processor included in device 105. Debug system 110 is then allowed access to one or more of the debug features of device 105 based on debug permissions 140 in certificate 135. Debug system 110, for example, may send, to validation circuit 122, requests for setting breakpoints and tracing code execution by the graphics processor. Based on the permissions in the validated certificate 135, validation circuit 122 forwards these requests on to debug circuit 120 to be performed.

If, however, debug system 110 sends a debug request for tracing code execution in a network processor, then if certificate 135 does not indicate that the user has permission to access the network processor, the request is ignored. In some embodiments, a request to access debug features not allowed by certificate 135 may result in a current debug session being terminated and certificate 135 being invalidated, requiring the user to repeat the above procedure to generate a new certificate. In other embodiments, the user may receive, on debug system 110, a warning that the requested debug operation is not allowed. In such embodiments, validation circuit 122 may keep a count of unauthorized requests and terminate the current debug session after a predetermined number of has been reached.

Otherwise, debug system 110 may continue to access the permitted debug features until the current debug session ends. The current debug session may be terminated for various reasons. For example, certificate 135 may include an epoch value that indicates a particular amount of time. Validation circuit 122 is further configured to end an active debug session in response to a determination that the particular amount of time has expired since receiving certificate 135. In addition, validation circuit 122 may be further configured to end an active debug session in response to a determination that a number of allowed device resets, as indicated by certificate 135, have occurred. The user may terminate the current debug session by sending, via debug system 110, a termination command, and/or by disconnecting a communication link (e.g., pulling a universal serial bus (USB) cable from debug system 110 and/or device 105).

Implementation of an authorized debug techniques as described above may provide access to debug functions of a device by authorized users after the device has entered production. Such a technique may allow a service technician to identify an issue with a defective device more rapidly than without such capabilities. A software developer may be able to utilize production devices to prototype new software. A hardware developer may use the debug features to identify circuits that cause performance bottlenecks for particular types of operations. In a pre-production environment, the authorized debug techniques may allow a management team to restrict access, by members of the product development team, to certain circuits in the device. For example, a new product may include a new security processor. Access to this security processor can be restricted to only the product development team members working directly on the new security processor, while allowing other team members access to other circuits in the new product.

It is noted that system 100 as illustrated in FIG. 1 is merely an example. The illustration of FIG. 1 has been simplified to highlight features relevant to this disclosure. Various embodiments may include different configurations of the circuit blocks, including additional functional blocks such as a debug tool installed in debug system 110, and a memory included in server computer system 115 for storing debug policies.

The system illustrated in FIG. 1 depicts three main blocks associated with a system for implementing authorized debug techniques. In the next three figures, additional details will be described for each of these three blocks. Details regarding a device that supports authorized debugging are shown in FIG. 2.

Figure 2:
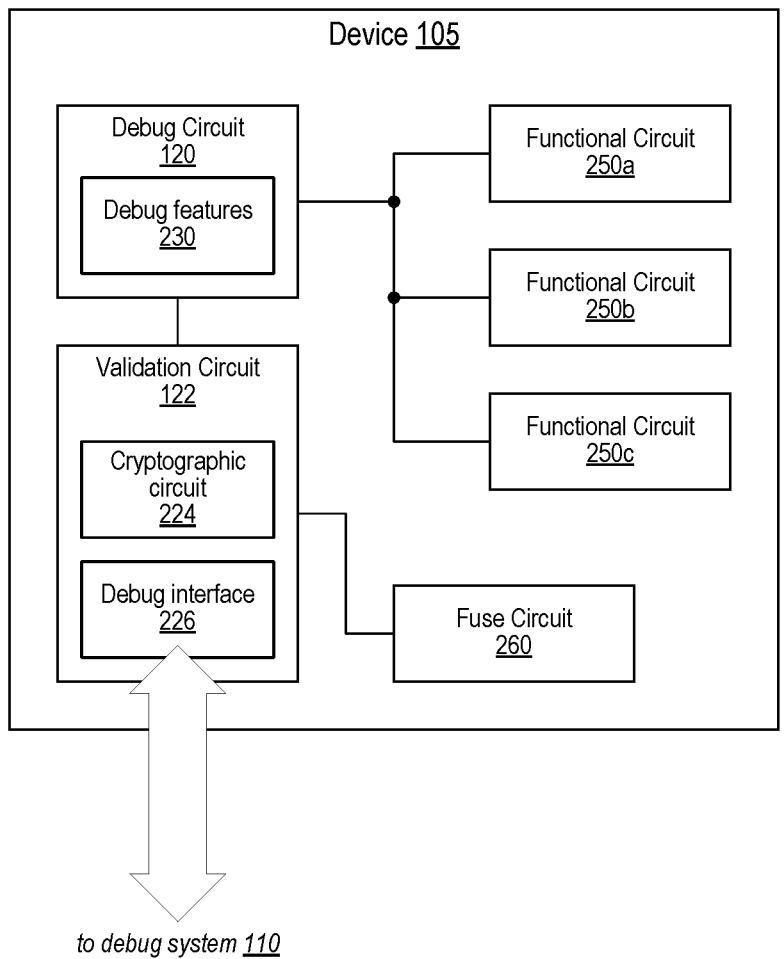
FIG. 2 shows a block diagram of an embodiment of a device, used in the system of FIG. 1.

Moving to FIG. 2, a block diagram of an embodiment of device 105 from FIG. 1 is shown. As illustrated, device 105 may be a desktop or laptop computer, a tablet device, a smartphone, or other type of smart device. In some embodiments, device 105 is an IC coupled to a communication interface or other type of interface that includes connectivity to a debug system. As described above, device 105 includes debug circuit 120 and validation circuit 122. In addition, device 105 includes functional circuits 250a-250c (collectively functional circuits 250) and fuse circuit 260. Debug circuit 120 includes one or more debug features 230, and validation circuit 122 includes cryptographic circuit 224 and debug interface 226.

As illustrated, validation circuit 122 of device 105 communicates with a debugger system, such as debug system 110, via debug interface 226. Debug interface 226 supports one or more communication protocols, including general purpose communications protocols (e.g., USB, Bluetooth™, and the like) and/or debug/test protocols (JTAG, SWD, and/or others). In some embodiments, debug interface may support a proprietary interface. In some embodiments, validation circuit 122 and/or debug interface 226 may need to be enabled before debug interface 226 is capable of receiving messages. For example, validation circuit 122 may be enabled in response to a particular combination of voltage levels on particular physical connections of debug interface 226 during a power-on reset or other particular types of resets. Once enabled, debug interface is capable of receiving messages from debug system 110.

As disclosed above, validation circuit 122 is configured, in response to receiving a request to access debug features 230, to send to debug system 110, an identification value corresponding to device 105. In various embodiments, the identification value may be indicative of a group of devices, such as a particular product, or be unique to a portion of a family (e.g., devices from a same manufacturing lot), or to a single device. In order to store the identification value that is unique to a portion of a particular product (including a single device), fuses within fuse circuit 260 may be programmed during a manufacturing process, such as at the end of a testing process. Accessing a particular memory location associated with fuse circuit 260 may return the identification value. In some embodiments, the identification value may be accessible only via a security processor which limits access to particular circuits within device 105. The identification value may be encrypted when it is received, in which case validation circuit 122 may use cryptographic circuit 224 to decrypt the identification value before sending to debug system 110. In other embodiments, validation circuit 122 sends the encrypted version of the identification value to debug system 110.

In some embodiments, validation circuit 122 sends other information to debug system 110 in addition to the identification value. For example, validation circuit 122 may generate a liveness token that includes a one-time use value (e.g., a nonce), and send the generated liveness token with the identification value. Validation circuit 122 may be further configured to save a copy of the liveness token and record a time stamp corresponding to when this particular nonce is generated and/or sent, and to disregard any requests associated with this particular nonce after a given amount of time has elapsed since the time stamp.

Validation circuit 122 may also be configured to send information indicative of available features of the debug circuit, as well as currently enabled features of debug circuit 120. For example, device 105 may be booted into a particular debug mode in which a portion of debug features 230 are enabled, and/or a different portion are not available. As used herein, an "enabled debug feature" refers to a supported debug feature that may be accessed by a currently connected debug system that has general permission to access debug circuit 120. An "available debug feature" refers to a supported debug feature that may be enabled if the currently connected debug system has explicit permission, e.g., from certificate 135, to access that supported debug feature.

Validation circuit 122 is configured to receive a certificate generated by a server computer system, the certificate including encoded debug permissions. At a point in time after the identification value is sent to debug system 110, validation circuit 122 receives, from debug system 110, certificate 135 (shown in FIG. 1). Validation circuit 122 is further configured, in response to receiving certificate 135, to determine if a certificate is expected to be received. As part of the debug validation process, validation circuit 122 confirms that certificate 135 is expected. For example, a hacker may attempt to trick device 105 into allowing debug system 110 access to debug features 230 using a certificate that had previously been used but has been altered to appear to be currently valid. If validation circuit 122 does not have a record of a request for debug access (e.g., has issued a liveness token that is still valid), then validation circuit 122 denies the received certificate 135 and may refuse any further attempt by debug system 110 to access debug features 230. This refusal may last until device 105 performs a power-on reset or other similar type of reset.

If validation circuit 122 is expecting to receive certificate 135, then validation circuit 122 may perform one or more additional validation procedures. For example, certificate 135 may include the liveness token that was previously sent to debug system 110, and the token, in some embodiments, may be encrypted by server computer system 115 (FIG. 1) prior to generating certificate 135. Validation circuit 122 confirms that the received liveness token is valid by comparing the received liveness token to the saved liveness token. Certificate 135 may further include encrypted and/or hashed values such as a server token, or a certificate signature. Validation circuit 122, using cryptographic circuit 224, validates any additional encrypted/hashed values that may be used to confirm that certificate 135 is a valid certificate issued by server computer system 115. A failure to validate any one these values may result in validation circuit 122 denying certificate 135 and refusing access to debug features 230.

Received certificate 135 further includes encoded debug permissions. In response to a successful validation of certificate 135, validation circuit 122 is configured to, as shown, extract and decode the encoded debug permissions. In some embodiments, the debug permissions are encoded using the previously sent identification value, in whole or in part. In such embodiments, validation circuit 122 decodes the debug permissions using the identification value. Validation circuit 122 is further configured to, using the decoded debug permissions, initiate an active debug session. During an active debug session, validation circuit 122 enables one or more of debug features 230 for access by debug system 110. In response to the enabling, debug system 110 may send debug requests to debug circuit 120 via validation circuit 122. The enabled ones of debug features 230 allow access to one or more of functional circuits 250.

Functional circuits 250 may include any particular circuit blocks included in device 105. For example, functional circuit 250a may be a processing core or multicore complex, functional circuit 250b may be a graphics processor, functional circuit 250c may be a network interface (e.g., Ethernet). In various embodiments, functional circuits 250 may be included on a same IC, on different ICs on a same circuit board, on different circuit boards, or on a combination thereof. Using the enabled debug features, debug system 110 may be capable of, for example, tracing a flow of a program executed by functional circuit 250a, monitor and edit image data transferred to/from functional circuit 250b, and read and write registers associated with functional circuit 250c.

After an active debug session has been activated, validation circuit 122 may end the active session in response to a variety of events. As illustrated, validation circuit 122 is configured to end an active debug session in response to a determination that a particular amount of time has expired since receiving certificate 135. This amount of time may be indicated in certificate 135, for example as a certificate epoch value. In other embodiments, this amount of time may be predetermined and stored in a memory accessible by validation circuit 122. In various embodiments, validation circuit 122 may initiate a timer circuit or record a time stamp associated with a start of the active debug session, such as when certificate 135 is received from debug system 110. When the particular amount of time has elapsed, validation circuit 122 may send a notification to debug system 110 indicating an imminent end to the current debug session, and may provide an option to extend the debug session by requesting an extension to certificate 135 or by requesting a new certificate. In some embodiments, validation circuit 122 may provide a new liveness token to debug system 110 if requested before ending the current active debug session. Debug system 110 may then use the new liveness token to request a new certificate form server computer system 115, and subsequently use the new certificate to keep the current debug session active for an extended amount of time.

Validation circuit 122 may also be configured to end an active debug session in response to a determination that a number of allowed device resets, as indicated by certificate 135, have occurred. As part of an active debug session, device 105 may be reset one or more times by any one of various reset sources. Certificate 135 may include a value indicating a number of resets that device 105 is allowed to undergo before the current active debug session is terminated. In some cases, asserting a reset on device 105 may be a method for attempting to gain unauthorized access to device 105. In other cases, asserting multiple resets on device 105 may be useful or even necessary for testing a particular feature or identifying a cause for a particular failure. Accordingly, certificate 135 may include a number of allowed resets based on identified needs of a user of debug system 110.

One form of hacking attack includes attempting to hijack an active debug session. As associated with debugging activity, hijacking an active debug session refers to a second party attempting to gain control over an active debug session of a first party. For example, a first party may establish a debug session utilizing a remote connection that couples debug system 110 to device 105 via Ethernet, WiFi, cellular connectivity, or a combination thereof. This first party is granted a valid certificate to initiate an active debug session with device 105. A second party attempts to take control of this remote debug session either by establishing a physical connection to device 105, e.g., by switching a cable coupled to debug interface 226, or by intercepting internet traffic between device 105 and debug system 110.

As a mitigation against such attacks, validation circuit 122 is configured, after receiving the debug request from a first computing device, to end an active debug session in response to a determination that a second computing device has been connected to device 105. The determination that a second computing device has been connected to device 105 may be using a variety of techniques. For example, debug interface 226 may include circuits capable of detecting a switch between cables that are physically coupled to device 105. The act of disconnecting and reconnecting cables may generate one or more anomalies that are detected by such circuits in debug interface 226. In other attacks, a cable used to connect device 105 to debug system 110 may include electronic switching circuits that, when activated, re-route communications to a computer system of the second party. In such cases, impedances between device 105 and the computer system of the second party may be different than when debug system 110 was connected. Debug interface 226 may be capable of detecting such impedance changes, for example, by differences in received voltage levels and/or timing of transitions on received signals.

To mitigate against a second party intercepting internet traffic between device 105 and debug system 110, debug system 110 may include, in some embodiments, an identifier, based on, e.g., a serial number of included hardware or software, that is included with some or all of debugging commands sent by debug system 110. A switch to a computer system of the second party may result in a different identifier. In other embodiments, debug system 110 and validation circuit 122 are configured to establish a cryptographic channel, based on mutual authentication as established through implementation of industry standard or proprietary protocols. Communication between debug system 110 and validation circuit 122 may then be performed over this secure channel such that the second party is not capable of intercepting or interjecting into the secure channel.

It is noted that the embodiment of FIG. 2 is merely an example to demonstrate the disclosed concepts. In other embodiments, a different combination of circuits may be included. For example, only three functional circuits are illustrated, but any suitable number of functional circuits may be included. A fuse circuit is described as including the identification value, but in other embodiments, other forms of non-volatile memory, including flash and one-time programmable read-only memory may be used. Debug interface 226 is shown as part of validation circuit 122, but may be included as part of a different circuit or as a standalone circuit within device 105.

FIG. 1 depicts a system for implementing authorized debug techniques and FIG. 2 shows an embodiment of a device that supports authorized debug techniques. A debug system is presented next, in FIG. 3.

Figure 3:
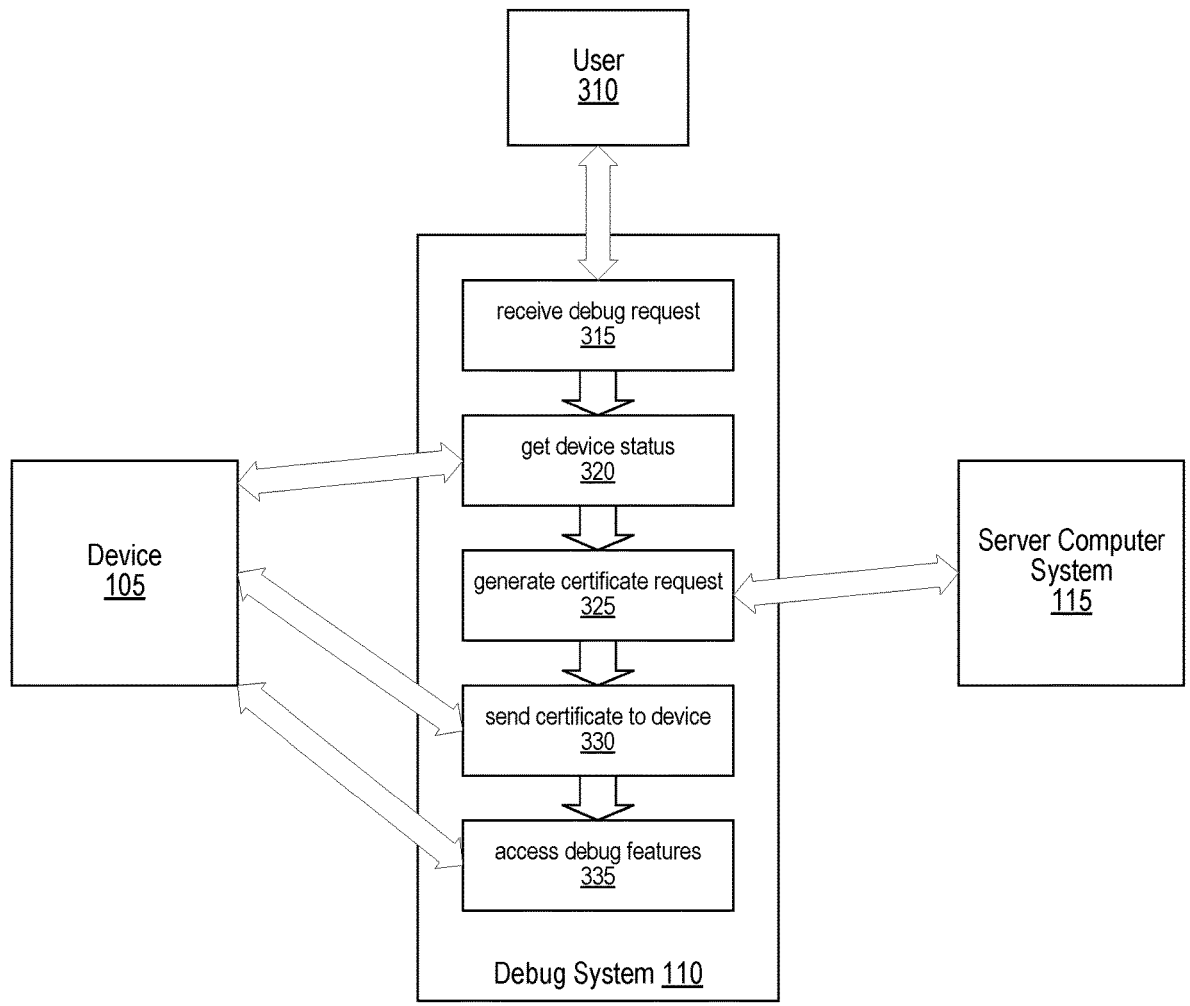
FIG. 3 depicts a block diagram of an embodiment of a debug system, used in the system of FIG. 1.

Turning to FIG. 3, a block diagram of an embodiment of debug system is shown. As illustrated FIG. 3 includes debug system 110 in communication with device 105 and server computer system 115. User 310 operates debug system 110 to perform debug tasks on device 105. To perform these debug tasks, debug system performs a set of operations, numbered 315, 320, 325, 330, and 335. To perform the operations 315-335, debug system 110 utilizes hardware circuits, software processes, or a combination thereof. For example, debug system 110 may be a desktop or laptop computer system that includes or has access to a non-transitory, computer-readable medium having program instructions stored thereon that are executable by the computer system to cause operations 315-335 to perform as described herein. In some embodiments, debug system 110 may include hardware circuits coupled to the computer system to support communication with device 105, such as a USB connected debug dongle that supports JTAG, SWD, and/or other testing communication protocols.

If user 310 desires to perform debug tasks on device 105, user 310 sends a request to debug system 110. Debug system 110, in operation 315, receives the debug request and sends, to device 105, a request to access one or more debug features of device 105. The request may be a single indication that debug system 110 requests access to the debug features or may include a plurality of requests for access two or more particular debug features.

Device 105 receives the request and replies with one or more values that include a status of device 105. Debug system 110, in operation 320, receives the device status from device 105, which may include values such as an identification value, debug features available in device 105, indications of which debug features are currently enabled, a liveness token, and the like.

In response to receiving an identification value from the device, debug system 110, in operation 325, generates a certificate request. This certificate request includes, for example, user credentials associated with user 310, device information including a device identifier, location information of device 105 and/or debug system 110, indications of particular debug features to be accessed, the liveness token, and other similar values. After generating the certificate request, debug system 110 sends this certificate request to server computer system 115. If the user credentials are valid, then debug system 110 receives a certificate from the server computer system, the certificate including ones of the requested debug permissions that are granted. In some cases, user 310 may not be authorized to access particular debug features that were requested. The certificate, therefore, indicates which of the requested debug features are permitted. In some embodiments, the certificate is encrypted, such that device 105 is capable of decrypted the certificate, while debug system 110 is not capable. In such embodiments, debug system 110 may not be aware of which features are accessible until after device 105 has validated the certificate.

In operation 330, debug system 110 sends the received certificate to device 105. In some embodiments, debug system 110 does not alter the certificate. As stated, the certificate may, in such embodiments, be encrypted in a manner that debug system 110 is not capable of decoding all or part of the certificate. Debug system 110 merely passes the certificate on to device 105, which may then validate the certificate. After the certificate has been validated, device 105 initiates an active debug session and, in operation 335, debug system 110 accesses one or more of the permitted debug features of device 105 based on the debug permissions in the certificate.

It is noted that the debug system shown in FIG. 3 is merely an example to demonstrate the disclosed concepts. Although five operations are illustrated in FIG. 3, in other embodiments, debug system may include any suitable number of operations. For example, a user authorization operation may be performed by the debug system to receive the user credentials from the user. The debug system may, in some embodiments, validate licenses associated with any software included in the debug system.

FIGS. 2 and 3 illustrate embodiments of a device and a debug system, respectively, that support authorized debug techniques. A server computer system that issues the certificates described above is presented in FIG. 4.

Figure 4:
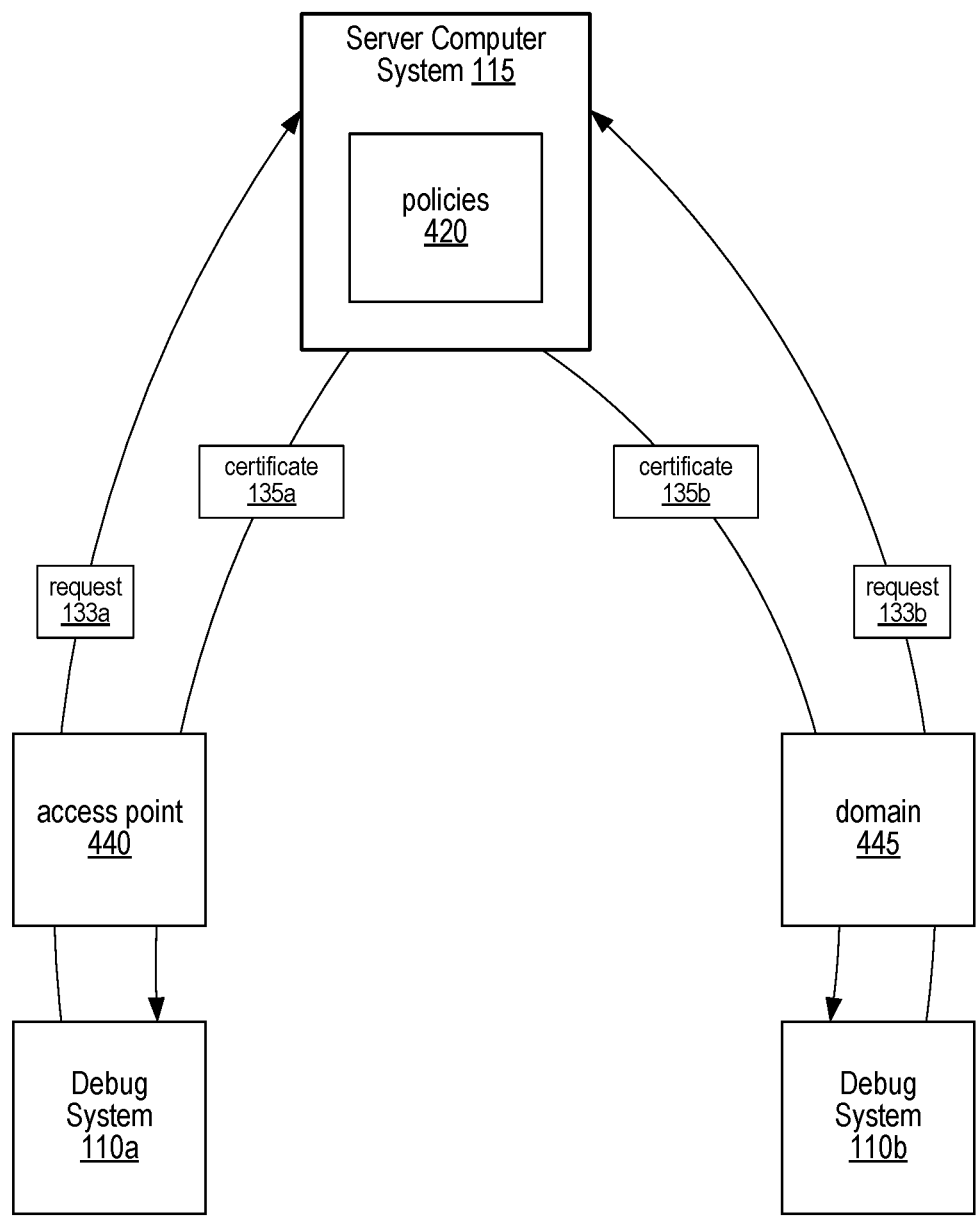
FIG. 4 illustrates a block diagram of an embodiment of a server computer system and two debug systems.

Proceeding to FIG. 4, a block diagram for a network of systems that includes a server computer system and two debug systems, all supporting authorized debug techniques, is depicted. Network 400 includes server computer system 115, coupled to debug system 110a via access point 440 and coupled to debug system 110b via domain 445.

Server computer system 115 maintains policies 420 that indicate debug permissions for one or more users to access debug features of one or more devices. A given policy included in policies 420 may be associated with a particular user, a category or group of users, a single device, a particular class of devices, a particular location, a set of locations, or a combination thereof. For example, one policy may include all debugging permissions for a single user across a range of classes of devices and locations. A different policy may include debugging permissions for all users in all locations of one particular class of devices. Another policy may, for a particular team of users such as a product development team, include debugging permissions for a product under development by the team and limited to a particular network location associated with the team.

When a user of debug system 110a desires to debug a particular device, debug system 110a receives device information from the device and includes at least some of this information, including an identification value for the device, in request 133a sent to server computer system 115. As illustrated, server computer system 115 receives request 133a to access debug features of the particular device. After receiving request 133a, server computer system 115 validates, using the identification value, request 133a. This validation includes identifying the user, e.g., using user credentials, and determining if this user has permission to access debug features of the particular device associated with the identification value. Server computer system 115 accesses policies 420 based on the identified user, the identification value of the device, or a combination thereof. One or more policies may be identified.

In response to the validating, server computer system 115 determines debug permissions for the user based on the one or more identified policies. For example, two policies may be identified. A first policy may indicate a baseline set of debug permissions to be granted to any authorized user of a particular class of devices. This baseline set may represent a portion of all debug features available for the particular class of devices. A second policy may be associated with the identified user, and may grant the identified user access to additional debug features not included in the baseline. In some embodiments, the policy may grant the additional access to any device in the particular class, while in other embodiments, the additional access may be granted for one or more particular devices included in the particular class of devices.

Using the one or more identified policies, server computer system 115 determines a list of debug features to which the identified user will be granted access. In some embodiments, request 133a may include a first value indicating one or more of the debug features for which access is requested by the identified user. Server computer system 115 generates, using the one or more identified policies, a second value indicating at least one of the one or more debug features for which access is granted. For example, request 133a may include a first value indicating a desire to access debug features A, B, C, and D. A first identified policy may grant access to feature A as part of a baseline set of debug permissions. A second identified policy may grant the identified user access to debug features B and D. None of the identified policies may grant access to feature C for the particular device. Accordingly, server computer system 115 generates the second value to indicate that access to debug features A, B, and D is granted.

After the access permissions have been determined for request 133a, server computer system 115 generates certificate 135a, including the second value. Certificate 135a may also include additional values, including for example, user information identifying the validated user, some or all of the device information received in request 133a, the liveness token, a server generated token, a certificate identification value, a certificate signature, and the like. In various embodiments, server computer system 115 may encrypt some or all of the values include in certificate 135a. In some embodiments, server computer system 115 may encrypt the completed certificate 135a, even if some of the included values have already been encrypted separately. After certificate 135a has been generated, including any encryption operations, server computer system 115 sends certificate 135a to debug system 110a via access point 440.

In some embodiments, validating the request comprises determining a geographic location of debug systems 110a and 110*b*. In various embodiments, the illustrated elements may be co-located in a same building, located in different buildings of a campus of a particular entity, different cities across the world or any combination thereof. For example, server computer system 115 access point 440 and debug system 110*a* may be located on a same campus of a corporate entity. Debug system 110*b* may be located in a different city than the campus and accesses server computer system 115 via domain 445 that is associated with an internet service provider (ISP) that is not a part of the corporate entity.

Server computer system 115 may utilize various techniques for determining the location of a given one of debug systems 110. In some embodiments, debug systems 110*a* and/or 110*b* may include geographic location data, such as provided by a global positioning system. In other embodiments, server computer system 115 may determine a location of debug systems 110*a* and 110*b* based on information included in Ethernet packets received by server computer system when debug systems 110*a* and 110*b* send respective requests 133*a* and 133*b*. These Ethernet packets may include internet protocol (IP) addresses and/or media access control (MAC) addresses. Since request 133*a* comes from access point 440 that is within a same campus as server computer system 115 may be capable of determining a particular room in a particular building of the campus where debug system 110*a* is located by accessing mapping data that references locations of various access points installed around the campus. Such mapping data may be maintained by system administrators for the campus, and made available to server computer system 115. Using such mapping data, policies 420 may be capable of linking debug access permissions to particular rooms within the campus. For example, a testing technician may only be granted debug permissions when the technician is located in a particular testing lab or a production test facility. Outside of these locations, the testing technician may be granted only a baseline set of debug permissions, or no permissions at all.

Server computer system 115 may also utilize internet domain information to determine a location of a given debug system. Debug system 110*b* is located away from the campus and, therefore, may be using an access point for which server computer system 115 does not have location data. For example, debug system 110*b* may be located at a factory store associated with the corporate entity that is known to utilize a particular ISP with an associated domain name. Accordingly, when server computer system receives request 133*b* from domain 445, server computer system 115 may determine that the location is the factory store and will grant permissions for the associated user accordingly. For example, the associated user may be a technical support specialist assigned to the factory store, and therefore may be granted a particular set of debug permissions to provide support to customers. In contrast, domain 445 might be associated with an ISP in a global region that is blacklisted by server computer system 115 due to a prevalence of hacking attacks originating from the blacklisted region. In such a case, request 133*b* may be denied and no certificate issued.

It is noted that FIG. 4 is merely an example. The block diagrams of network 400 have been simplified for clarity. In other embodiments, additional elements may be included such as additional access points, domains, debug systems and the like. Although a single server computer system is illustrated, any suitable number of server computer systems may be utilized for authenticating debug requests, each server with a local copy of policies 420 or accessing a common single copy of policies 420.

FIGS. 1-4 describe systems associated with authorized debugging techniques. These descriptions refer to various requests, certificates, and policies used with the authorization techniques. Examples of a request, policies, and a certificate are illustrated in FIG. 5.

Moving now to FIG. 5, three tables are presented, depicting examples of a request, policies, and a certificate used in an authorized debug technique. FIG. 5 includes request 133 corresponding to request 133 in FIG. 1 and requests 133*a* and 133*b* in FIG. 4. Policies 420 corresponds to policies 420 in FIG. 4, and certificate 135 corresponds to certificate 135 in FIG. 1 and certificates 135*a* and 135*b* in FIG. 4.

As described above, request 133 is sent from debug system 110 to server computer system 115 to request certificate 135. To successfully receive certificate 135, debug system 110 includes a variety of information in request 133. For example, request 133 includes device information 502, which in turn, includes any relevant information associated with device 105, such as a device identifier that is specific to device 105. Device information 502 may also include a device class identifier that is common to device 105 and other products of a same type. For example, if device 105 is an IC, then the device class identifier may correspond to all copies of the same IC. If device 105 is a computer or other type of computing device, then device information 502 may also include information regarding components included in device 105, as well as installed software, such as an operating system identifier and version number.

Request 133, as shown, also includes current device configuration 504. Current device configuration 504 includes information regarding a current status of device 105, including, for example, status of one or more debug features that are available and/or are enabled. Liveness token 506, as described above, is a value that device 105 uses to determine a validity of a received certificate 135. Liveness token 506 is generated by device 105 and sent to debug system 110 for inclusion in request 133. Liveness token 506 may include a one-time-use nonce value that changes each time a debug system 110 requests a new debug session.

Requested number of resets 508 is a user-specified value that identifies a number of times that an active debug session may be resumed after device 105 is reset. By default, a debug session may be terminated in response to a reset of device 105. Each allowed reset allows the active debug session to be resumed after completion of the reset. Requested debug features 510 is another user-defined value that indicates to which debug features of device 105 that the user is requesting access. In some embodiments, debug system 110 request, from device 105, a first value indicating a plurality of debug features available on device 105, and a second value indicating a subset of the plurality of debug features that are currently locked. Debug system 110, using the first value and the second value, includes, in request 133, a third value (requested debug features 510) indicating one or more of the plurality of debug features to be accessed.

As illustrated, request 133 further includes user credentials 512. In various embodiments, debug system 110 may save user credentials 512 (also referred to herein as authentication credentials) from an earlier point in time when the current user logged into debug system 110, or may request user credentials 512 before or during the generation of request 133. User credentials 512 may be encrypted before being included in request 133. In some embodiments, request 133 may be encrypted before being sent to server computer system 115.

After receiving request 133, server computer system 115 uses the included information to authenticate a user of debug system 110. Server computer system 115 uses user credentials 512 to identify and authenticate the user of debug system 110. After a successful authentication, server computer system 115 uses the identity of the user and the device information to identify relevant policies in policies 420. Policies 420 includes one or more policies that are used by server computer system 115 to determine which debug features of device 105 the user will be permitted to access.

As shown, policies 420 includes two groups of policies, one associated with user ID 522a and one associated with device ID 524a. User ID 522a may be any suitable value associated with a particular user, such as the user's name, a username, an employee number, and the like. User ID 522a, in the illustrated example, is associated with user credentials 512. Three policies are listed under user ID 522a, one apiece for device IDs 524a and 524b and one for device class 525c. Device IDs 524a and 524b identify one unique device each, while device class 525c applies to a class of devices, such as a particular product line. For the present example, device ID 524a corresponds to device information 502 which identifies device 105 for which user ID 522a is requesting debug access.

As shown, device ID 524a is associated with four policies, one apiece for user IDs 522a and 522b, and one apiece for user teams 529a and 529b. The policies for user IDs 522a and 522b each correspond to one particular user. User teams 529a and 529b each may correspond to a plurality of users, such as all users included in a product development team (which may include hardware designers, programmers, test engineers) or all users in a particular functional department (e.g., a technical support department).

Server computer system 115 may identify all policies associated with user ID 522a and device ID 524a. As illustrated, one policy for device ID 524a is grouped under user ID 522a and one policy for user ID 522a is grouped under device ID 524a. In addition, if user ID 522a is included in user team 529a or 529b, then these policies may also be included. Similarly, if device ID 524a is included in device class 525c, then this policy would be included. For the present example, server computer system 115 identifies two policies, one for device ID 524a and one for user ID 522a.

Server computer system 115 generates certificate 135 using the two identified policies. In various embodiments, when more than one policy is identified, server computer system may prioritize one policy over the other, may restrict permissions to those common to both policies, may open debug permissions to those identified in either policy, or may use another similar technique to determine valid permissions. As illustrated, policies include locations 526a-526g and permissions 528a-528g. Locations 526a and 526d each identify one or more geographic locations at which user ID 522a is permitted to access debug features of device ID 524a. As described above, server computer system 115 may be capable of identifying a particular room and/or building associated with a particular entity (e.g., business, university, government agency, and the like). In addition, for locations external to a location of the particular entity, server computer system may be capable of identifying a country or city. In some embodiments, a value of locations 526a or 526d may include a value indicating there are no location limitations.

Permissions 528a and 528d identify one or more debug features of device ID 524a that user ID 522a is permitted to access. Server computer system 115 compares requested debug features 510 from request 133 to the debug features identified in permissions 528a and 528d. In the present example, if a given requested debug feature is included in permissions 528a and/or 528d, then that requested debug feature is identified in certificate 135 in debug permissions 540. Otherwise, requested debug features excluded from permissions 528a and 528d are not authorized for access by user ID 522a. In addition, requested number of resets 508 from request 133 may be confirmed by permissions 528a and 528d. For example, if the user requests ten resets, but is limited to six by one of the identified policies, then permitted number of resets 538 is limited to six.

Server computer system 115, in addition to permitted number of resets 538 and debug permissions 540, includes, in certificate 135, user information 532 and device information 502. In various embodiments, user information 532 may include some or all of user credentials 512, user ID 522a, if applicable, a user team, and other such information that applies to user ID 522a. Certificate 135 also includes liveness token 506 received from request 133 as well as server token 536. Server token 536, like liveness token 506, may include a one-time-use nonce value that is generated by server computer system 115 and encrypted or hashed using a keyword known to both server computer system 115 and device 105.

Additional information included in certificate 135 includes certificate ID 533, certificate signature 534, and certificate epoch 535. As shown, certificate ID 533 is a value unique to certificate 135 that may be used by server computer system 115 to record and store a copy for later reference. Certificate epoch 535 identifies an amount of time for which certificate 135 is valid. In some embodiments, the amount of time may indicate a length of time that certificate 135 is valid after device 105 initiates an active debug session based on the certificate, e.g., a number of minutes, hours, days, etc. In other embodiments, certificate epoch 535 may indicate a particular calendar date and time of day on which certificate 135 expires. Certificate signature 534 is a hash of all or a portion of certificate 135 after all information (except certificate signature 534) has been added. In some embodiments, certificate signature may be used by debug system 110 and/or device 105 to determine if certificate 135 is valid, e.g., has been received without errors.

It is noted that the tables depicting request 133, policies 420, and certificate 135 are merely examples to demonstrate the disclosed techniques. Data included in the illustrated tables is intended only to show logical associates and is not intended to imply a particular arrangement and/or order of included values. Information included in each of the example tables may vary in other embodiments. Any of the illustrated examples may include a different combination of information as may be suitable for a given application.

The systems described above in regards to FIGS. 1-5 may perform authorized debugging techniques using a variety of methods. Three such methods are described in FIGS. 6, 7, and 8.

Figure 6:
FIG. 6 depicts a flow diagram of an embodiment of a method for operating a device that supports authenticated debugging techniques.

Turning now to FIG. 6, a flow diagram for an embodiment of a method for establishing, by a device, an authorized debug session is shown. Method 600 may be performed by a computing device such as device 105 in FIGS. 1-3. Referring collectively to FIGS. 1 and 6, method 600 begins in block 601.

At block 610, method 600 includes receiving, by device 105, request 130 to access debug features. As illustrated, device 105 includes a plurality of available debug features that are performed by debug circuit 120. In some embodiments, some or all of these debug features may be disabled when a debug session is not active. Validation circuit 122 performs authorization functions to prevent unauthorized access to the debug functions of debug circuit 120. To activate the debug features, validation circuit 122 receives and authenticates certificate 135 from debug system 110. Certificate 135 includes an indication of one or more debug features that debug system 110 is authorized to access. Before validation circuit 122 receives and authenticates certificate 135, debug system 110 may not be allowed access to any debug features. In some embodiments, however, debug system 110 may be allowed access to a baseline set of debug features.

Method 600 includes, at block 620, sending, by device 105 an identification value that corresponds to device 105. The identification value is associated with device 105. In various embodiments, the identification value identifies one particular device, all copies of a same device, e.g., one product line, or a family of related devices. The identification value may be further associated with one or more users, as well as one or more geographic or network locations. The identification value is sent to debug system 110, which uses the identification value to request certificate 135. In addition, a liveness token may be generated by validation circuit 122. The liveness token includes a one-time use value that may be included in, and used to authenticate, certificate 135. The generated liveness token is sent, along with the identification value, to debug system 110. Device 105 may further send information indicative of the available debug features of debug circuit 120 as well as an indication of currently enabled features of the debug circuit, e.g., a baseline set of features, if available.

At block 630, method 600 further includes receiving, by device 105, certificate 135 generated by server computer system 115. In some embodiments, in response to receiving certificate 135, validation circuit 122 determines if a certificate is expected to be received. For example, validation circuit 122 may determine if a liveness token was generated, is still valid, and has not been used to authenticate a different certificate. Certificate 135 includes various pieces of information, including encoded debug permissions, a copy of the identification value, a copy of the liveness token, a digital signature, and/or other types of information as described above. Portions or all of certificate 135 may be encrypted and, if validation circuit 122 determines that certificate 135 was expected, the encrypted portions are decrypted. The received liveness token extracted from certificate 135 is compared to a locally stored copy of the generated liveness token. The received digital signature may be authenticated. The received identification value may be compared to the local copy.

Method 600 also includes, at block 640, decoding, by device 105, the debug permissions using the identification value. Based on the comparisons of received information to locally stored copies of the same information, and based on a successful authentication of the digital signature, the debug permissions included in certificate 135 are extracted and decoded. Validation circuit 122 may, if applicable, enable permitted functions in debug circuit 120. In embodiments in which available debug features are sent by device 105 to debug system 110, the permitted debug features may be compared to the available debug features. If a permitted debug feature was not indicated as an available debug feature (e.g., debug circuit 120 is not capable of performing the feature) then validation circuit 122 may treat this as a sign of a tampered certificate and invalidate certificate 135 and deny access to any debug features.

Method 600, at block 650, also includes, using the decoded debug permissions, enabling by device 105, one or more of the debug features. As illustrated, an active debug session is initiated by validation circuit 122 in response to a successful authentication of certificate 135, and debug circuit 120 is selectively permitted to be accessed. Debug system 110 is permitted, by validation circuit 122, to access the debug features of debug circuit 120 as indicated by certificate 135. In some embodiments, debug system 110 may be further permitted to access any baseline set of debug features regardless of indications in certificate 135.

After the active debug session has begun, it may be terminated in response to a determination that a particular amount of time has expired since receiving certificate 135. For example, the amount of time may be indicated by a certificate epoch value included in certificate 135. The active debug session may also be terminated in response to a determination that a number of allowed device resets, as indicated by certificate 135, have occurred. If device 105 receives debug request 130 from a first computing device (e.g., debug system 110), then the active debug session may be terminated in response to a determination that a second computing device has been connected to device 105. The method ends in block 690.

Figure 7:
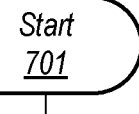
FIG. 7 illustrates a flow diagram of an embodiment of a method for operating a debug system that supports authenticated debugging techniques.

Proceeding now to FIG. 7, a flow diagram of a method for requesting, by a debug system, an authorized debug session is illustrated. Method 700 may be performed by a debug system such as debug system 110 in FIGS. 1, 3, and 4. In some embodiments, method 700 may be performed in combination with method 600 in FIG. 6. For example, method 700 may be performed by debug system 110 while device 105 performs method 600. In some embodiments, method 700 may be performed by a computer system included in debug system 110 that has access to a non-transitory, computer-readable medium having program instructions stored thereon that are executable by the computer system to cause the operations described in regards to FIG. 7. Referring collectively to FIGS. 1, and 7, method 700 begins in block 701.

Method 700 includes, at block 710, sending, by debug system 110 to device 105, request 130 to access debug features of device 105. A user (e.g., a hardware or software developer, a technical support technician, and the like) utilizes debug system 110 to obtain access to debug features included in device 105. As described above, request 130 may include requests for a variety of information, from device 105 including, for example, any combination of device information including an identification value, a liveness token that includes a one-time use value, a first value indicating a plurality of debug features available on the device, and a second value indicating a subset of the plurality of debug features that are currently locked, a current configuration of device 105, and the like. In the present example, request 130 includes at least a request for the identification value.

At block 720, method 700 further includes, in response to receiving an identification value from device 105, sending, by debug system 110 to server computer system 115, certificate request 133 to access the debug features of device 105. As illustrated, request 133 includes the identification value received from device 105. Request 133 may further include, for example, any suitable combination of the liveness token, authentication credentials associated with the user, a requested number of allowed device resets, and other such information as described above. In addition, the first and second values associated with available and locked debug features may be used to determine a third value that indicates one or more of the plurality of debug features to be accessed. This third value may also be included in request 133.

Method 700, at block 730, also includes receiving, by debug system 110, certificate 135 from server computer system 115. Certificate 135 includes an indication of debug permissions that debug system 110 is permitted to access. In some embodiments, certificate 135 is encrypted and debug system 110 may not have any capability of reading any included information. In other embodiments, only a portion of certificate 135 is encrypted and debug system 110 may have access to an unencrypted portion, such as a granted number of allowed device resets and an indication of the granted debug permissions. To mitigate tampering with certificate 135, a hash value based on at least a portion of the information included in certificate 135, including any unencrypted information, is included.

At block 740, method 700 further includes sending, by debug system 110, certificate 135 to device 105. After certificate 135 has been received, debug system 110 forwards certificate 135 to device 105 for authentication. If the authentication is successful, an active debug session is initiated. To authenticate certificate 135, device 105 decrypts the encrypted portions of certificate 135, and may compare one or more received values to locally stored and/or locally generated values to determine if received and local value match.

Method 700 also includes, at block 750, accessing, by debug system 110, one or more of the debug features of device 105 based on the debug permissions in certificate 135. After the debug session is activated, the user of debug system may utilize any combination of permitted debug features. The user may further cause up to the permitted number of allowed resets of device 105 while maintaining the active debug session. After the user completes the any debug activities, a command to end the current active debug session may be sent to the device. In some embodiments, certificate 135 may further include an epoch value that indicates a particular amount of time for which the certificate is valid, or indicate a date and time of day at which the certificate expires. The method ends in block 790.

Moving to FIG. 8, a flow diagram of a method for generating, by a server computer system, a certificate for an authorized debug session is shown. Method 800 may be performed by a server computer system such as server computer system 115 in FIGS. 1, 3, and 4. In some embodiments, method 800 may be performed in combination with methods 600 and 700 in FIGS. 6 and 7. For example, method 800 may be performed by server computer system 115 while debug system 110 performs method 700 to request a debug session and device 105 performs method 600 to support this request. Method 800, in some embodiments, may be performed by one or more computer systems included in server computer system 115. Such computer system may have access to a non-transitory, computer-readable medium having program instructions stored thereon that are executable by the computer system to cause the operations described in regards to FIG. 8. Referring collectively to FIGS. 1, 4, and 8, the method begins in block 801.

Method 800, at block 810, includes maintaining, by server computer system 115, one or more policies 420 that indicate debug permissions for one or more users to access debug features of device 105. As previously described, policies 420 includes one or more policies indicative of permissions granted to a user or group of users for debugging a particular device or family of devices. In some embodiments, policies 420 may be associated with a particular user or user group, and indicate permissions for one or more devices usable by the user or group. In other embodiments, policies 420 may be associated with a particular device or device family, and indicate permissions for one or more users to debug the particular device or device family. Policies 420 may include a mix of policies associated with particular users and with particular devices.

At block 820, method 800 includes receiving, by server computer system 115 from debug system 110, request 133 to access debug features of device 105. As illustrated, request 133 includes an identification value associated with device 105. The identification value may correspond to a single physical device 105 (e.g., a unique ID assigned to device 105) or to a plurality of devices of a same design (e.g., a part name or number). In some embodiments, a particular user of debug system 110 logs into server computer system 115 before request 133 is received. In other embodiments, software and/or hardware in debug system 110 accesses server computer system 115 without the particular user logging in to server computer system 115.

Method 800 further includes, at block 830, validating, by server computer system 115 using the identification value, request 133. For example, authentication credentials for the particular user are received. In various embodiments, server computer system 115 may request the authentication credentials from debug system 110 after receiving request 133, or debug system 110 may include the authentication credentials as part of request 133. After a successful confirmation of the authorization credentials, a particular policy from policies 420 that corresponds to the particular validated user is identified. Server computer system 115 determines if the particular policy is valid for device 105 or for a class of devices that includes device 105. In some embodiments, additional validation operations of request 133 may include determining a geographic location of the debug system, and/or determining a validity of a liveness token included in request 133.

At block 840, method 800 also includes, in response to the validating, determining, by server computer system 115, debug permissions for the particular user based on the particular one of policies 420. For example, request 133 includes a first value indicating one or more of the debug features to be accessed. Based on a comparison of the first value and the particular policy, a second value is generated that indicates at least one of the one or more debug features for which access is granted.

Method 800, at block 850, further includes sending, by server computer system 115, certificate 135 to debug system 110. As shown, certificate 135 includes the second value, thereby indicating the granted debug permissions. Certificate 135 may further include, other values as described above, such as a certificate epoch, a permitted number of allowed resets, the identification value and a liveness token received in request 133, and the like. After the various values have been added, certificate 135 may be encrypted. In some embodiments, a hash value based on all or a portion of certificate 135 is generated and added. Such a hash value may be generated, and in some cases added, before encryption is performed. Certificate 135 is then sent to debug system 110. The method ends in block 890.

It is noted that the methods of FIGS. 6-8 are merely examples methods for operating a device, a debug system, and a server computer system that each support respective features associated with the disclosed authorized debugging techniques. As disclosed above, methods 600, 700, and 800 may be performed concurrently, for example, by the respective elements in FIG. 1. Although the methods are shown with starting and ending blocks, any suitable combination of the methods may repeat. Variations of the disclosed methods are contemplated. For example, a user authentication operation may be added to any of the methods.

FIGS. 1-8 illustrate apparatus and methods for a device, a debug system and a server computer system that support authorized debugging techniques. Any or all of these apparatus may include one or more of a variety of computer systems, such as a desktop computer, laptop computer, smartphone, tablet, wearable device, and the like. In some embodiments, the circuits described above may be implemented on a system-on-chip (SoC) or other type of integrated circuit. A block diagram illustrating an embodiment of computer system 900 is illustrated in FIG. 8. Computer system 900 may, in some embodiments, correspond to any of device 105, debug system 110, and/or server computer system 115. As shown, computer system 900 includes processor complex 910, communication (comm.) interface 920, memory controller circuit 940, and memory circuit 950. These functional circuits are coupled to each other by communication bus 960.

Processor complex 910, in various embodiments, may be representative of a general-purpose processor that performs computational operations. For example, processor complex 910 may be a central processing unit (CPU) such as a microprocessor, a microcontroller, an application-specific integrated circuit (ASIC), or a field-programmable gate array (FPGA). In some embodiments, processor complex 910 may correspond to a special purpose processing core, such as a graphics processor, audio processor, or neural processor, while in other embodiments, processor complex 910 may correspond to a general-purpose processor configured and/or programmed to perform one such function. Processor complex 910, in some embodiments, may include a plurality of general and/or special purpose processor cores as well as supporting circuits for managing, e.g., power signals, clock signals, and memory requests. In addition, processor complex 910 may include one or more levels of cache memory to fulfill memory requests issued by included processor cores.

Communication (Comm.) interface 920 may be configured to coordinate data transfer between computer system 900 and one or more peripheral devices. Such peripheral devices may include, without limitation, storage devices (e.g., magnetic or optical media-based storage devices including hard drives, tape drives, CD drives, DVD drives, etc.), or any other suitable type of peripheral devices. In some embodiments, communication interface 920 may be configured to implement a version of Universal Serial Bus (USB) protocol or IEEE 1394 (Firewire®) protocol. Communication interface 920 may also be configured to coordinate data transfer between computer system 900 and one or more devices (e.g., other computing systems or integrated circuits) coupled to computer system 900 via a network. In one embodiment, communication interface may be configured to perform the data processing necessary to implement an Ethernet (IEEE 940.3) networking standard such as Gigabit Ethernet or 10-Gigabit Ethernet, for example, although it is contemplated that any suitable networking standard may be implemented.

Memory controller circuit 940, as shown, includes communication circuits for accessing memory circuits both internal (memory circuit 950) and external (e.g., a DRAM module or external storage devices) to computer system 900. Memory controller circuit 940 includes circuits for scheduling memory requests issued by processor complex 910. Memory controller circuit 940 may include logical-to-physical address maps for decoding memory requests and locating a particular memory circuit that is indicating in the requests. Memory controller circuit 940 may further include or have access to one or more memory caches for accessing frequently used memory locations.

Memory circuit 950, in the illustrated embodiment, includes one or more memory circuits for storing instructions and data to be utilized within computer system 900. In various embodiments, memory circuit 950 may include any suitable type of memory such as a dynamic random-access memory (DRAM), a static random access memory (SRAM), a read-only memory (ROM), electrically erasable programmable read-only memory (EEPROM), or a non-volatile memory, for example. It is noted that in the embodiment of computer system 900, a single memory circuit is depicted. In other embodiments, any suitable number of memory circuits may be employed.

Figure 9:
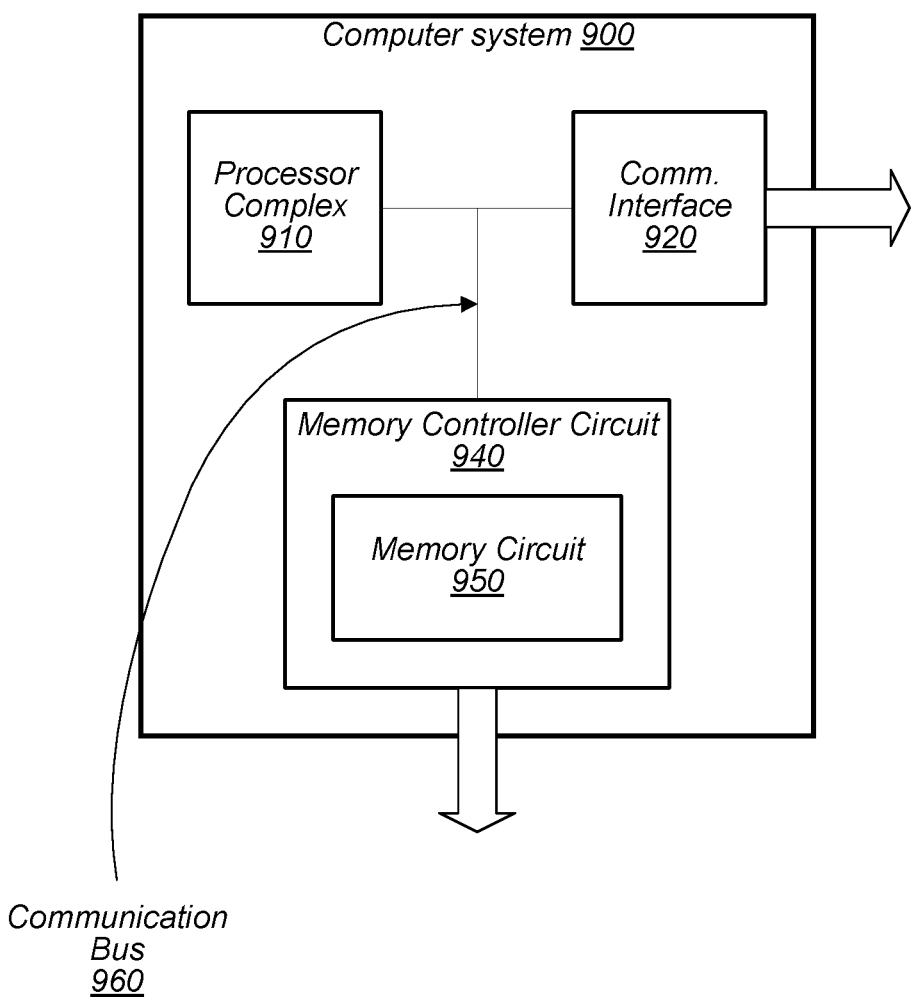
FIG. 9 depicts a block diagram of an embodiment of a computer system.

It is noted that the embodiment illustrated in FIG. 9 includes one example of a computer system. A limited number of circuit blocks are illustrated for simplicity. In other embodiments, any suitable number and combination of circuit blocks may be included. For example, in other embodiments, security and/or cryptographic circuit blocks may be included.

Figure 10:
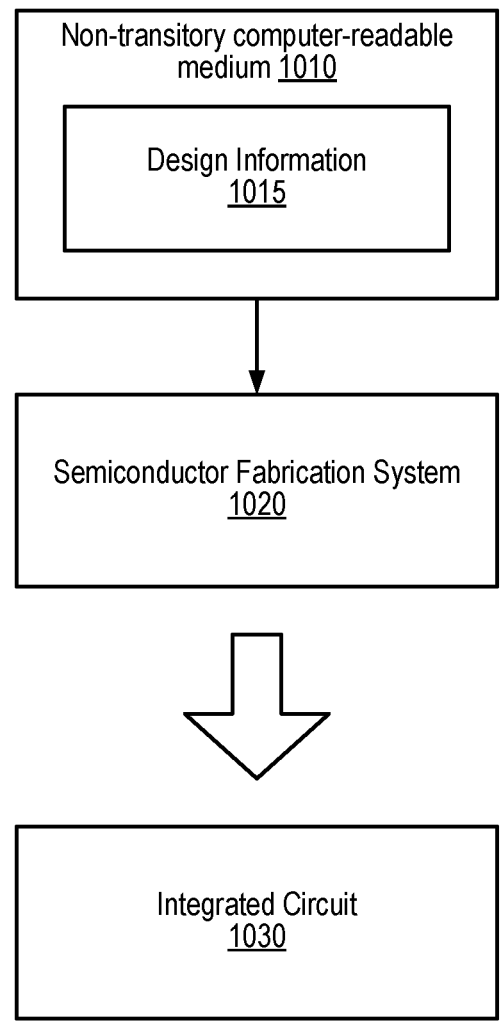
FIG. 10 illustrates a block diagram depicting an example computer-readable medium, according to some embodiments.

FIG. 10 is a block diagram illustrating an example of a non-transitory computer-readable storage medium that stores circuit design information, according to some embodiments. The embodiment of FIG. 10 may be utilized in a process to design and manufacture integrated circuits, such as, for example, an IC that includes device 105 of FIG. 1. In the illustrated embodiment, semiconductor fabrication system 1020 is configured to process the design information 1015 stored on non-transitory computer-readable storage medium 1010 and fabricate integrated circuit 1030 based on the design information 1015.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Non-transitory computer-readable storage medium 1010 may include two or more memory mediums which may reside in different locations, e.g., in different computer systems that are connected over a network.

Design information 1015 may be specified using any of various appropriate computer languages, including hardware description languages such as, without limitation: VHDL, Verilog, SystemC, SystemVerilog, RHDL, M, MyHDL, etc. Design information 1015 may be usable by semiconductor fabrication system 1020 to fabricate at least a portion of integrated circuit 1030. The format of design information 1015 may be recognized by at least one semiconductor fabrication system, such as semiconductor fabrication system 1020, for example. In some embodiments, design information 1015 may include a netlist that specifies elements of a cell library, as well as their connectivity. One or more cell libraries used during logic synthesis of circuits included in integrated circuit 1030 may also be included in design information 1015. Such cell libraries may include information indicative of device or transistor level netlists, mask design data, characterization data, and the like, of cells included in the cell library.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 is configured to operate according to a circuit design specified by design information 1015, which may include performing any of the functionality described herein. For example, integrated circuit 1030 may include any of various elements shown or described herein. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus for authenticating a debug session, comprising:
   one or more functional circuits;
   a debug circuit configured to implement one or more debug features for use with the one or more functional circuits during a debug session, wherein at least one of the one or more debug features are disabled outside of a debug session when a debug session is not active; and
   a validation circuit configured, during an active debug session, to:
      receive, from a particular computing device that is external to the apparatus, a request to access at least one of the debug features of the debug circuit;
      send, external to the apparatus, an identification value corresponding to the apparatus, wherein the identification value is sent to a server computer system in a certificate request;
      receive a certificate generated by the server computer system, the certificate authenticating the active debug session and including encoded debug permissions to enable the at least one debug feature;
      decode the encoded debug permissions using the identification value; and
      using the decoded debug permissions, enable the at least one of the debug features for use with the one or more functional circuits.

2. The apparatus of claim 1, wherein the validation circuit is further configured to:
   in response to receiving the request, generate a liveness token, wherein the liveness token includes a one-time use value; and
   send the generated liveness token with the identification value.

3. The apparatus of claim 2, wherein the validation circuit is further configured, in response to receiving the certificate, to:
   compare a received liveness token extracted from the certificate to the generated liveness token; and
   based on the comparison, selectively permit the at least one of the debug features to be accessed.

4. The apparatus of claim 1, wherein the validation circuit is further configured to send information indicative of available features of the debug circuit and currently enabled features of the debug circuit.

5. The apparatus of claim 1, wherein the validation circuit is further configured, in response to receiving the certificate, to determine if the reception of the certificate is expected.

6. The apparatus of claim 1, wherein the validation circuit is further configured to end the active debug session in response to a determination that a particular amount of time has elapsed since receiving the certificate, wherein the particular amount of time is indicated in the certificate.

7. The apparatus of claim 1, wherein the validation circuit is further configured to end the active debug session in response to a determination that a number of allowed device resets, as indicated by the certificate, have occurred.

8. The apparatus of claim 1, wherein the validation circuit is further configured to end the active debug session in response to a determination that a different computing device has been connected to the apparatus in place of the particular computing device.

9. The apparatus of claim 1, wherein the validation circuit is further configured to authenticate a digital signature that is included in the received certificate.

10. A non-transitory computer-readable storage medium having instructions stored thereon that are executable by a computer system to perform operations comprising:
   sending, by the computer system to a device to be debugged, a request to access debug features of the device, wherein the debug features are disabled outside of a debug session when a debug session is not active;

in response to receiving an identification value from the device, sending, by the computer system to a server computer system, a certificate request to enable one or more of the debug features of the device, the certificate request including the identification value;

receiving a certificate generated by the server computer system, the certificate including debug permissions to authenticate a debug session and enable at least a portion of the one or more requested debug features;

sending the certificate to the device; and accessing ones of the debug features of the device that have been enabled based on the debug permissions in the certificate after the debug session is authenticated.

11. The non-transitory computer-readable storage medium of claim 10, wherein the operations further comprise:

requesting, from the device, a liveness token that includes a one-time use value; and including the liveness token in the certificate request.

12. The non-transitory computer-readable storage medium of claim 10, wherein the operations further comprise including authentication credentials for a user of the computer system in the certificate request.

13. The non-transitory computer-readable storage medium of claim 10, wherein the operations further comprise:

requesting, from the device, a first value indicating a plurality of debug features available on the device, and a second value indicating a subset of the plurality of debug features that are currently locked;

using the first value and the second value to generate a third value indicating one or more of the plurality of debug features to be accessed; and including the third value in the certificate request.

14. The non-transitory computer-readable storage medium of claim 10, wherein the operations further comprise sending, to the device, a command to end a current debug session.

15. The non-transitory computer-readable storage medium of claim 10, wherein the operations further comprise including, in the certificate request, a user-specified number of device resets that are allowed by the device while maintaining a validity of the certificate.

16. A method for authenticating a debug session, comprising:

maintaining, by a server computer system, one or more policies that indicate debug permissions for one or more users to access debug features of one or more devices, wherein the debug features are disabled for respective devices outside of a debug session while a debug session is not active;

receiving, by the server computer system from a debug system, a request to enable one or more debug features of a particular device to be debugged, the request including an identification value associated with the particular device, wherein the debug system is external to the particular device;

validating, by the server computer system using the identification value, the request;

in response to the validating, determining, by the server computer system, ones of the debug features that can be permitted for a particular user based on the one or more policies; and sending, by the server computer system, a certificate to the debug system including encoded debug permissions, the certificate indicating:

permission to authenticate a debug session and enable a plurality of the debug features; and the ones of the requested debug features that are permitted to be enabled after the debug session is authenticated.

17. The method of claim 16, wherein the validating includes:

receiving authentication credentials for the particular user; and in response to a successful validation of the authentication credentials, identifying a particular policy that corresponds to the particular user.

18. The method of claim 17, wherein the validating, using the identification value, includes determining if the particular policy is valid for the particular device or for a class of devices that includes the particular device.

19. The method of claim 17, wherein determining the debug permissions for the particular user includes:

receiving, from the request, a first value indicating the one or more debug features to be enabled; and generating, using the particular policy, a second value indicating at least one of the one or more debug features that are permitted to be enabled.

20. The method of claim 16, wherein validating the request comprises determining a geographic location of the debug system.

\* \* \* \* \*